UNITED STATES PATENT OFFICE.

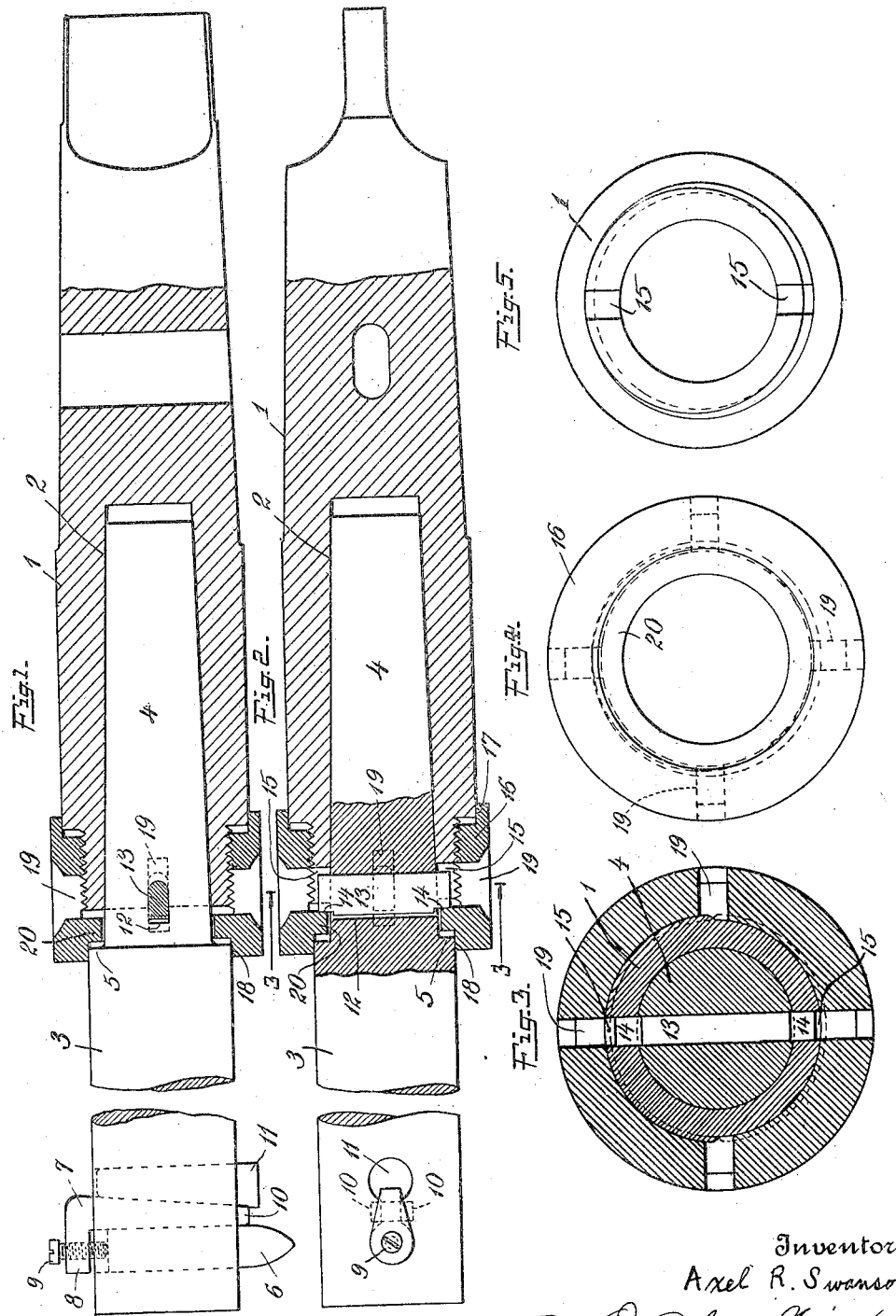

AXEL R. SWANSON, OF CHICAGO, ILLINOIS.

BORING-BAR.

1,381,943.  Specification of Letters Patent.  Patented June 21, 1921.

Application filed August 26, 1918. Serial No. 251,531.

*To all whom it may concern:*

Be it known that I, AXEL R. SWANSON, a citizen of the United States, residing at Chicago, in the county of Cook and State of Illinois, have invented certain new and useful Improvements in Boring-Bars, of which the following is a specification.

The invention relates particularly to a device for securing a boring bar in place in its socket and for removing it from the socket. The object of the invention is to provide improved mechanism for this purpose which enables the boring bar to be easily secured in place or removed without the possibility of injuring either the boring bar or the socket and disturbing the alinement thereof.

In the accompanying drawing I have shown the preferred embodiment of the invention, but it will be understood that various changes may be made within the scope of the appended claims without departing from the spirit of the invention. I have also shown and described briefly but have not claimed means for securing and holding in place in the end of the boring bar a cutting tool, which said invention is fully described and claimed in my co-pending application Serial No. 253,783, filed September 12, 1918.

My invention will be further and better understood by reference to the accompanying drawings and in which—

Figure 1 is a longitudinal sectional view, the boring bar proper being shown in elevation.

Fig. 2 is a view similar to Fig. 1, but taken at right angles thereto.

Fig. 3 is a transverse sectional view on an enlarged scale along the line 3—3 of Fig. 2.

Fig. 4 is a detail end view of the operating ring.

Fig. 5 is an end view of the socket.

Referring to the drawing, 1 represents the socket member in which the boring bar is adapted to be held. This socket member may be a separate element, such as shown, adapted to be inserted in the spindle of a boring machine, or it may be a permanent or integral part of the spindle. The socket member 1 is provided with an accurately alined central tapered aperture 2.

The boring bar proper is represented by 3 and this is provided with a shank 4 of reduced diameter which is tapered to accurately fit the socket aperture 2. A shoulder 5 is provided between the body part of the boring bar and the shank 4 thereof. At the outer end of the boring bar 3 means is provided for holding a cutting tool such as indicated at 6, which cutting tool fits a transverse aperture in the boring bar and is engaged at one side by a tapered wedge or gib 7. The gib 7 is provided at its larger end with an extension 8 which carries a screw 9 adapted to engage the end of the tool 6. Fingers 10 at the opposite end of the gib serve to hold it against longitudinal movement. For locking the tool in place after adjustment, there is provided a wedge 11 which fits a second transverse aperture in the bar and which engages the inclined side of the gib 7. When the wedge is driven into place it forces the gib into engagement with the tool, thus locking the tool in place.

The shank of the boring bar is provided with a transverse aperture or slot 12 adapted to receive a key 13. Preferably the key 13 at its outer edge has a flat surface and at its inner edge is half-round. The outer edge of the key is preferably notched near the ends, as shown at 14, 14. When the key is provided with flat and half-round surfaces, as shown, the aperture 12 is provided with similar surfaces, the aperture being wide enough to permit the key to be freely inserted or removed.

The outer end of the socket member 1 is provided with two opposite key seats 15, 15, preferably in the form of notches, which are adapted to register with the key aperture 12 in the shank of the boring bar and to receive the ends of the key 13.

The outer end part of the socket member 1 is reduced in diameter and is threaded. Engaging this reduced threaded part of the socket member is a threaded operating ring 16 which is preferably so formed as to have a working fit at 17 with the exterior surface of the socket member and a working fit at 18 with the exterior surface of the body of the boring bar. The ring 16 is formed with four equally spaced apertures 19, 19, which are adapted to serve for the engagement of a suitable wrench whereby the ring may be turned. The apertures are of the proper size and shape to permit the key 13 to be inserted through any one of them, the ring for this purpose being turned so that two of the apertures 19, 19, register with the notches 15, 15 of the socket member 1. Preferably each notch 19 has an outer plane surface and an inner half-round surface to conform to the corresponding surfaces of the key.

The ring 16 is provided with an inward extending flange 20 which is adapted at one side to engage the notched surfaces 14, 14 of the key 13 and which is adapted at the outer side to engage the shoulder 5 of the boring bar.

When the boring bar is to be put in place in the socket, it is inserted manually, care being taken to bring the key aperture 12 into alinement with the notches 15, 15. Then the ring 16 is turned to bring two apertures 19, 19, into register with the notches 15, 15. The key 13 is inserted through one of the apertures 19 and then the ring is turned in the direction to cause it to move inward on its threads. The flange 20 engages the notched surfaces 14, 14, the shoulders of the notches serving to prevent the key from sliding out before it is firmly engaged by the flange. Continued turning of the ring 16 forces the key 13 inward, the key in turn pressing against the inner surface of the aperture 12 and thus forcing the shank 4 into firm engagement with the walls of the socket aperture 2. Thus the boring bar is rigidly engaged with the socket member, the driving connection being not only frictional through the engagement of the tapered surface of the shank with the tapered surface of the aperture, but being also positive through the engagement of the ends of the key 13 with the walls of the notches 15, 15.

When the boring bar is to be removed, the ring 16 is turned in the other direction so as to move outward on its threads. The flange 20 is forced into engagement with the shoulder 5 and thus the shank 4 is drawn out of the socket far enough to loosen the key 13 and permit it to be taken out through one of the apertures 19. Then the boring bar can be removed manually.

It will be seen that by my improved construction I have provided means whereby the boring bar can be forced firmly into place without the use of wedges or other devices which have to be driven. In this way I avoid any disturbance of the alinement and any bending of the boring bar or of the socket member, or of both. My improved construction therefore maintains the true alinement indefinitely. In addition to maintaining the alinement, my construction enables the operator to secure and release the boring bar with a minimum of effort.

I claim:

1. The combination of a shouldered boring bar having a tapered shank and having an aperture extending transversely therethrough, a socket member having a tapered aperture adapted to receive the shank, a key adapted to be inserted in said transversely extending aperture in said boring bar, an operating ring threaded on the socket member and having a flange portion overlapping the end of the socket member, the flange portion of said operating ring being adapted to engage the key to force the shank of the boring member into the tapered aperture of the socket member, and adapted to engage the shoulder of the boring bar to draw the shank out of the aperture.

2. The combination of a shouldered boring bar having a tapered shank and having an aperture extending transversely therethrough, a socket member having a tapered aperture adapted to receive the shank, a key adapted to be inserted in said transversely extending aperture in said boring bar, an operating ring threaded on the socket member and having a flange portion overlapping the end of the socket member, the flange portion of said operating ring being adapted to engage the key to force the shank of the boring bar into the tapered aperture of the socket member and adapted to engage the shoulder of the bar to draw the shank out of the aperture, the flange portion of the ring engaging the ends of the key immediately adjacent the boring bar.

3. The combination of a shouldered boring bar having a tapered shank and having an aperture extending transversely therethrough, a socket member having a tapered aperture adapted to receive the shank, a key adapted to be inserted in said transversely extending aperture in said boring bar, an operating ring threaded on the socket member and having a flange portion overlapping the end of the socket member, the flange portion of said operating ring being adapted to engage the key to force the shank of the boring bar into the tapered aperture of the socket member and adapted to engage the shoulder of the bar to draw the shank out of the aperture, the opening of the flange portion of said ring being substantially the same size as the diameter of the shank adjacent the flange portion of the said ring.

4. The combination of a shouldered boring bar having a tapered shank, a socket member having a tapered aperture adapted to receive the shank, a key for connecting the socket member and the boring bar, and an operating ring threaded on the socket member and surrounding the key, the ring being provided with an inward projecting flange adapted to engage the key to force the shank of the boring bar into the aperture of the socket member and adapted to engage the shoulder of the bar to draw the shank out of the aperture.

5. The combination of a shouldered boring bar having a tapered shank with a key slot therein, a socket member having an aperture adapted to receive the shank and having key seats adapted to register with the said key slot, a key adapted to enter the said slot and seats to connect the socket member and the boring bar, and an operating ring threaded on the socket member and having apertures through which the key may be inserted or removed, the ring being provided with an inward projecting flange adapted to engage the key to force the shank of the boring bar into the aperture of the socket member and adapted to engage the shoulder of the bar to draw the shank out of the aperture.

In testimony whereof, I hereto affix my signature.

AXEL R. SWANSON.